United States Patent [19]

Fairchild

[11] Patent Number: 4,727,261
[45] Date of Patent: Feb. 23, 1988

[54] MULTIPLE POWER FET VEHICLE LAMP SWITCH ARRANGEMENT WITH CHARGE PUMP SHARING

[75] Inventor: Manuel R. Fairchild, Kokomo, Ind.

[73] Assignee: Delco Electronics Corporation, Kokomo, Ind.

[21] Appl. No.: 53,038

[22] Filed: May 22, 1987

[51] Int. Cl.[4] .............................................. B60Q 1/04
[52] U.S. Cl. ................................. 307/10 LS; 315/82; 340/76
[58] Field of Search ..................... 307/9, 10 R, 10 LS, 307/571, 577, 594, 597, 605; 315/76, 77, 80, 82; 340/74, 76

[56] References Cited

U.S. PATENT DOCUMENTS

| | | | |
|---|---|---|---|
| 4,001,664 | 1/1977 | Hyltin .................................... | 363/59 |
| 4,015,137 | 3/1977 | Kniesly et al. ................. | 307/10 LS |
| 4,047,091 | 9/1977 | Hutchines et al. ..................... | 363/59 |
| 4,603,269 | 7/1986 | Hochstein ........................... | 307/571 |
| 4,661,717 | 4/1987 | Nishioka ......................... | 307/10 LS |

OTHER PUBLICATIONS

S. D. Woithe, "Transistor Switching for High Power Headlights", *Electronics*, Australia, vol. 39, No. 5, pp. 56–59, Aug., 1977.

*Primary Examiner*—Bentsu Ro
*Attorney, Agent, or Firm*—Robert M. Sigler

[57] ABSTRACT

A power MOSFET switching control for multiple loads requiring current limiting at initial energization comprises at least two MOSFETs connected in series between one of the multiple loads and a power supply. Each MOSFET has a control electrode with a control electrode capacitance. Each control electrode is connected to a single charge pump, powered by the power supply, repeatedly in a pulsed manner to limit average current through its MOSFET. The individual control electrodes are connected to the charge pump alternately in a predetermined order such that no two control electrodes are connected to the charge pump simultaneously. In one mode of operation, the control electrodes and charge pump are connected and disconnected by clocked, multiplexing switch control means at predetermined times. In another mode of operation, only the connections are accomplished at the predetermined times; and the disconnections are in response to control electrode voltage sensing means. In this last mode of operation, each control electrode may include discharge means activatable by the clocked, multiplexing switch control at predetermined times after the disconnection from the charge pump.

6 Claims, 4 Drawing Figures

MULTIPLE POWER FET VEHICLE LAMP SWITCH ARRANGEMENT WITH CHARGE PUMP SHARING

BACKGROUND OF THE INVENTION

This invention relates to the power switching of multiple electric loads by power MOSFETs, wherein charge pumps are used to provide a voltage higher than the power supply voltage to the MOSFET gates. It particularly concerns such an arrangement for the switching of loads such as automotive headlamps requiring current limiting on initial turnon.

It is known, for power MOSFET switching with low voltage supplies such as the 12-14 volt supplies of motor vehicles, to use a charge pump to raise the gate voltage of the MOSFET to several times the supply voltage for efficient switching. Since the gate of the MOSFET is essentially capacitive with low leakage, a charge pump is generally adequate for charging the gate of the MOSFET and keeping it charged to the desired voltage. If there are multiple switched MOSFETs, the prior art includes a separate charge pump for each.

For loads such as automotive headlamps, which have very low resistance when cold and therefore require current limiting during initial energization, the MOSFETs may be initially pulse width modulated. Each charge pump will therefore be charging its corresponding MOSFET's gate capacitance for only a portion of the time at first, as the MOSFET is switched on and off in a duty cycle to limit the current therethrough. By the time the headlamp filament has warmed up sufficiently to accept full continuous gate voltage, the gate capacitance is substantially charged up and requires only a small current to remain charged. Thus, the charge pumps are not used to their full capacity. When the MOSFETs are pulsed, the charge pump current is diverted to ground when not supplied to the MOSFET gates. This is wasteful of circuitry and contributes to a higher idle die current in the circuit chip. If a single charge pump were used, it could be switched in a multiplexing arrangement among the MOSFETs with a significant saving of chip surface area, since charge pump circuitry requires capacitors that use chip surface area in large quantities.

SUMMARY OF THE INVENTION

The invention is thus directed to a power MOSFET switching control for multiple loads requiring current limiting at initial energization. The control comprises, in combination, an electric power supply having a supply voltage, at least two MOSFETs, each having a pair of current carrying electrodes connected in series between one of the multiple loads and the power supply, a control electrode responsive to the voltage between the control electrode and one of the current carrying electrodes to control the current flow between the current carrying electrodes and therefore through the corresponding load, and a control electrode capacitance. The control further comprises a single charge pump powered by the power supply and effective to provide a current flow at a voltage larger than that of the power supply, and means for connecting each of the MOSFET control electrodes to the charge pump repeatedly in a pulsed manner to limit average current through the MOSFET, the individual control electrodes being connected to the charge pump alternately in a predetermined order such that no two control electrodes are connected to the charge pump simultaneously. The load may be a vehicle lamp such as a headlamp.

The invention may comprise two separate clocked, multiplexing switch controls, one of which connects and disconnects the control electrodes and the charge pump at predetermined times and the other of which connects the control electrodes and charge pump at predetermined times but disconnects them in response to control electrode voltage sensing means when the control electrode voltage exceeds a reference. In this case, the apparatus is designed such that this is certain to occur within the time delay before connection of the next control electrode to the charge pump. The apparatus may include means to select the clocked, multiplexing switch controls depending on the voltage drop across the load. In addition, where the disconnection is based on the control electrode voltage, the apparatus may include control electrode discharge means activated by the clocked, multiplexing switch control after the disconnection.

Further details and advantages will be apparent from the accompanying drawings and following description of a preferred embodiment.

DESCRIPTION OF THE PREFERRED EMBODIMENT

Figure 1:
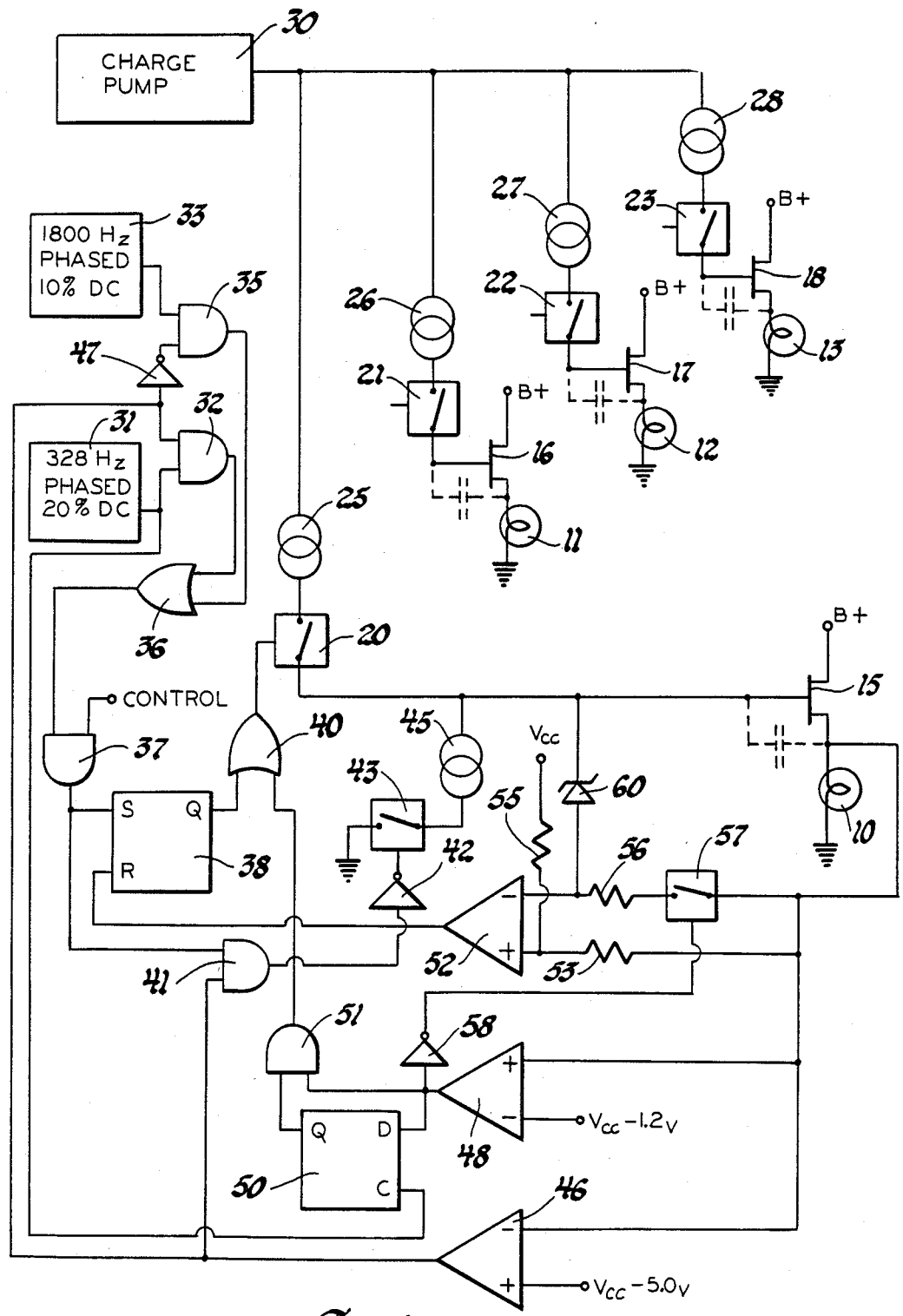
FIG. 1 shows a schematic and logical diagram of a preferred embodiment of the invention.

Referring to FIG. 1, an electric power supply is indicated by the positive supply voltage B+ and the ground symbol. This supply is capable of supplying electric current to a load or multiple loads at the supply voltage potential and may comprise the standard motor vehicle 12 volt power supply with battery, alternator, voltage regulator, etc.

Vehicle running lamps, such as headlamps 10, 11, 12 and 13 are connected from the ground connection of the power supply to the sources of MOSFETs 15, 16, 17 and 18, respectively, the MOSFETs having drains connected to B+, the source and drain of each MOSFET thus comprising current carrying electrodes in series with the lamp and power supply. The MOSFETs have control electrodes comprising gates and internal gate-to-source capacitances as indicated by the dashed line capacitors, the gate-to-source voltage comprising a control voltage to cause conduction or non-conduction between the current carrying electrodes. The gates of MOSFETs 15-18 are connected through electrically controlled switches 20-23, respectively, to current sources 25-28, respectively, the latter being controlled by a single charge pump 30, of normal construction, which boosts the power supply voltage up to about 21 volts. The remainder of the system shown in FIG. 1 acts to repeatedly connect charge pump 30, by means of current sources 25-28 and switches 20-23, to MOSFETs 15-18 in a predetermined order and control the current through MOSFETs 15-18 to ensure that charge pump 30 is activating only one of the MOSFETs at a time. The apparatus for switch 20 and MOSFET 15 is shown; the rest are identical.

Lamp 10, as well as the other lamps 11–13, are of the type having a filament with a very low resistance when cold but a higher resistance when warm. The filament resistance is too low at the moment of initial energization to provide current limiting sufficient to protect the MOSFET turned on hard with a high gate voltage; but it soon increases with current flow through the filament to a value which performs the required current limiting. Therefore, the apparatus described performs a three step lamp energization procedure. It first energizes the lamp in a pulsed manner with lamp voltage limited to 7 volts or less on each pulse. Since the gate-to-source capacitance of MOSFET 10 must be charged by charge pump 30 and current source 25 in order for the gate voltage to rise to conduction levels, this process is essentially a capacitor charging operation to 8 volts. The gate is left charged to 8 volts for a predetermined time and then discharged and left in an uncharged condition for a predetermined time. This action is repeated until the resistance of lamp 10, as indicated by the voltage drop across it, exceeds a predetermined level, whereupon the second step of lamp energization begins.

In the second step of lamp energization, the pulsed operation of the switch is continued and the gate voltage is still limited to 8 volts, but the gate is not discharged. Therefore, the charging of the gate-to-source capacitance tends to be a recovery of charge lost due to leakage. For this stage, the frequency of the pulse modulation is increased to help maintain a more constant gate voltage.

The third and final step of lamp energization removes the 8 volt limitation of the gate voltage and allows the full 21 volt charge pump output to appear on the gate. This is the full on condition which is maintained until the lamp is switched off. It should be noted that, although the operation of only one lamp is being described, each of the three steps is applied to each lamp, with the charge pump output being passed from one MOSFET to another repeatedly at each step. The circuits work independently, so that, if one lamp is ready to move to the next step it may do so independently of the others.

Referring to FIG. 1, a clocked, multiplexing switch control comprises a timing circuit 31 which provides a 328 Hz, phased, 20 percent duty cycle rectangular voltage wave to an input of an AND gate 32. Another clocked, multiplexing switch control comprises a timing circuit 33 which provides a 1800 Hz, phased, 10 percent duty cycle rectangular wave to one input of an AND gate 35. The outputs of AND gates 32 and 35 are provided to the inputs of an OR gate 36, the output of which is provided, along with a CONTROL signal, to the inputs of an AND gate 37. The CONTROL signal is essentially an on/off control for the lamps and may be applied to the circuits for each lamp simultaneously or individually, as are the outputs of timing circuits 31 and 33, which circuits are, like charge pump 30, common to all the circuits.

The output of AND gate 37 is connected to the set (S) input of a flip-flop 38 having a Q output connected to one input of an OR gate 40. Flip-flop 38, as shown in FIG. 1, is set by a high S input but reset by a low R input. Its actual construction and connections are shown in detail in FIG. 2, to be described at a later point in this specification. The output of OR gate 40 is connected to control the condition of switch 20, so that switch 20 closes with a high output of OR gate 40 and opens with a low output therefrom. The output of AND gate 37 is further connected to the input of an AND gate 41 having an output connected through an inverter 42 to control the condition of an electrically controlled switch 43. Switch 43 connects a current source 45 between the gate of MOSFET 15 and ground. Current source 45 is used, when activated by switch 43, to discharge the gate of MOSFET 15.

Voltage regulating apparatus, not shown, of standard circuit design, regulates voltage B+ to a slightly lower voltage $V_{cc}$ appropriate for electronic circuit chip power. A comparator 46 has an inverting input connected to the source of MOSFET 15, a non-inverting input connected to a voltage 5.0 volts less than $V_{cc}$, and an output connected to the other input of AND gate 32 and, through an inverter 47, to the other input of AND gate 35. This comparator selects one of the timing circuits 31 and 33 for application through OR gate 36 to the rest of this circuit by passing the 1800 Hz signal when the lamp voltage drop exceeds the reference voltage $V_{cc}-5.0$ and otherwise passing the 328 Hz signal.

Another comparator 48 has a non-inverting input connected to the source of MOSFET 15, an inverting input connected to a reference voltage 1.2 volts less than $V_{cc}$, and an output connected to the D input of a flip-flop 50. Flip-flop 50 has a C input connected to the output of timing circuit 31 and a Q output connected to one input of an AND gate 51, AND gate 51 having another input connected to the output of comparator 48 and further having an output connected to the other input of OR gate 40. At lamp voltage drops below $V_{cc}-1.2$, comparator 48 has a low output; however, at voltages above this reference, comparator 48 switches its output high to provide a constant on signal to switch 20.

A comparator 52 has a non-inverting input connected through a resistor 53 to the source of MOSFET 15 and through a resistor 55 to $V_{cc}$. Comparator 52 further has an inverting input connected through a resistor 56 and electrically controlled switch 57 in series to the source of MOSFET 15 and further connected to the anode of an 8 volt zener diode 60 having a cathode connected to the gate of MOSFET 15. Comparator 52 has an output connected to the reset (R) input of flip-flop 38; switch 57 is controlled, through an inverter 58, by the inverted output of comparator 48.

In operation, when the control signal is low, comparators 46, 48 and 52 have high, low and high outputs, respectively. Switch 43 is closed to activate current source 45 and hold the gate of MOSFET 15 low. This ensures that MOSFET 15 and lamp 10 are turned off. When the CONTROL signal goes high, the 328 Hz signal, selected by comparator 46, is passed to flip-flop 38. The beginning of the first 600 microsecond pulse thereof sets flip-flop 38, closes switch 20 and opens switch 43. Charge pump 30, acting through current source 25, begins to charge the gate-to-source capacitance of MOSFET 15. When the gate voltage of MOSFET 15 reaches a voltage 8 volts greater than the source voltage, zener diode 60 begins to conduct to prevent it from going any higher. In addition, comparator 52 is switched to a low output; and flip-flop 38 is reset (by the low R input, as described elsewhere). The reset of flip-flop 38 opens switch 20; and the gate-to-source voltage of MOSFET 15 remains at 8 volts until the end of the 600 microsecond pulse from the 328 Hz signal, at which time that signal, through AND gate 41 and inverter 42, closes switch 43 to discharge the gate-to-source capacitance of MOSFET 15 and thus decrease its gate voltage. Switch 20 remains closed for the remainder of the 3 millisecond period of the 328 Hz signal, but lamp 10 does not cool completely; and each successive closure of switch 20 further heats and increases the resistance of the lamp filament.

When the filament resistance of lamp 10 has increased such that the lamp voltage drop exceeds $V_{cc}-5.0$ volts, the output of comparator 46 switches low. This has two effects. One is to provide a constant low voltage to one input of AND gate 41, so that switch 43 does not close. The other is to choose the 1800 Hz signal from timing circuit 33 rather than the 328 Hz signal for application to the set input of flip-flop 38. The gate-to-source voltage of MOSFET 15 thus remains at a constant 8 volts with no discharge and with periodic "topping off" by charge pump 30 until the lamp voltage drop reaches $V_{cc}-1.2$ volts.

Comparator 48, at this point, switches its output high, which opens switch 57 to decouple the zener diode and allow the gate-to-source voltage of MOSFET 15 to rise above 8 volts to the full 21 volts of charge pump 30. In addition, flip-flop 50 is set and AND gate 51 set high to cause switch 20 to stay closed continuously until the CONTROL signal goes low or until the lamp voltage drop falls for some other reason such as a malfunction.

Figure 3:
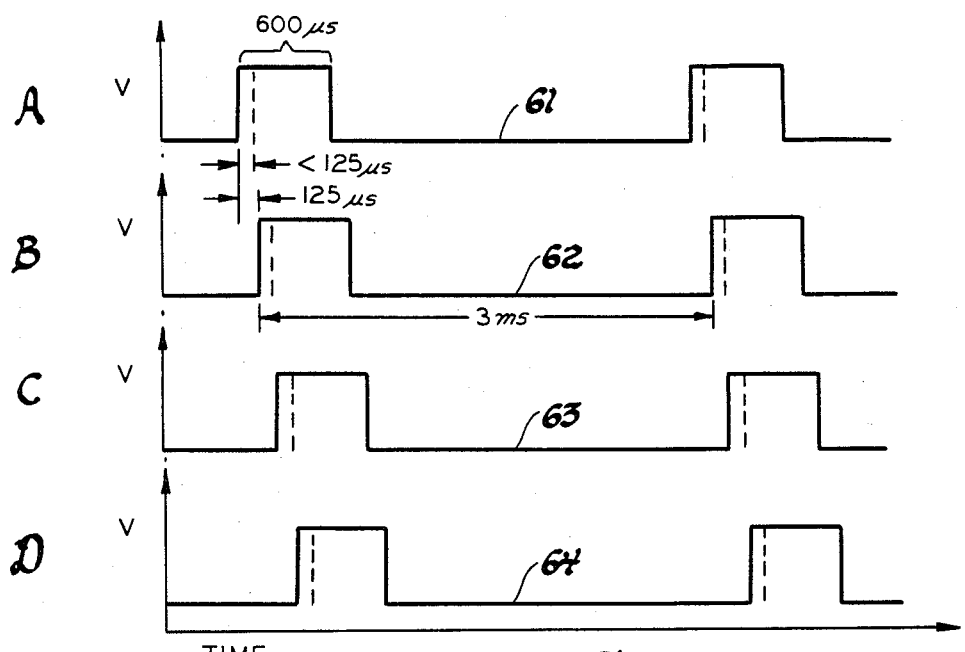
FIGS. 3 and 4 show voltage vs. time waveforms useful in illustrating the operation of the embodiment of FIGS. 1 and 2.

The operation of the circuit and its co-ordination with the other similar circuits is illustrated with reference to FIGS. 3 and 4. FIG. 3 is a series of waveforms of the 328 Hz, phased, 20 percent duty cycle voltage from timing circuit 31, as applied to each of the circuits for MOSFETs 15–18. Waveform 61 of FIG. 3A is the signal applied to the circuit of MOSFET 15; and waveforms 62, 63 and 65 of FIGS. 3B, 3C and 3D, respectively, are the signals applied to the circuits of MOSFETs 16, 17 and 18, respectively. Each waveform is delayed by 125 microseconds from the preceding as indicated; and the circuit is designed, with respect to the charge pump voltage, control electrode capacitance, and the impedance in the charging path from the charge pump to the control electrode capacitance through the MOSFET, so that the gate-to-source capacitance charging is completed to 8 volts within the first 125 microseconds of the on pulse, as shown by the dashed lines. The on pulse continues for the full 600 microsecond on period of the duty cycle before the MOSFET gate is discharged as described above. Thus, although each MOSFET is allowed to keep its gate charged for 600 microseconds and these periods overlap, the periods of charging, limited to the first 125 microseconds, do not overlap; and charge pump 30 need supply only one circuit at a time.

Figure 4:
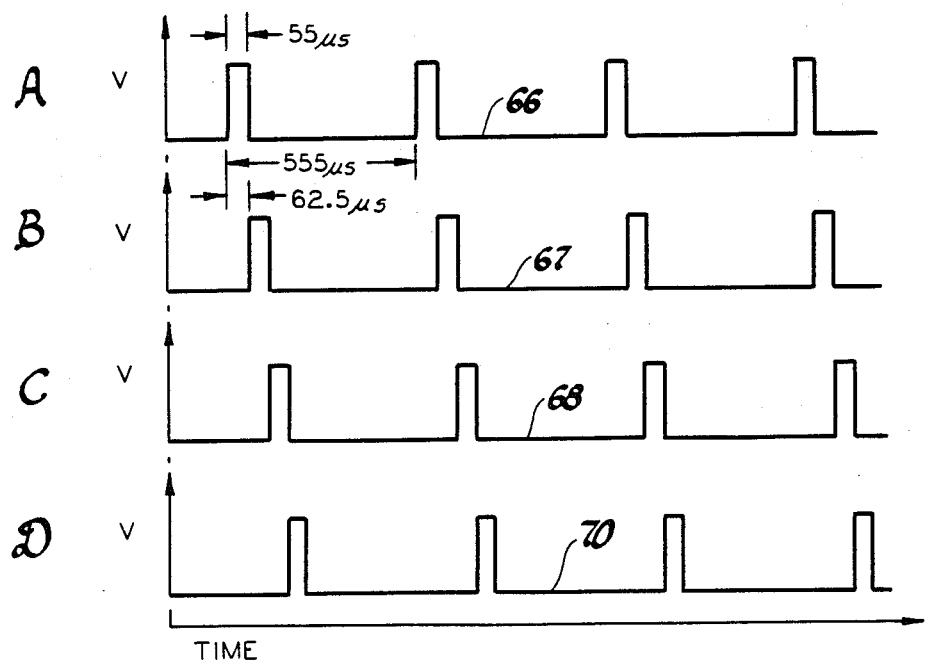

FIG. 4 shows the equivalent waveforms for the 1800 Hz, phased, 10 percent duty cycle voltage from timing circuit 33, as applied to each of the circuits for MOSFETs 15–18. Waveform 66 of FIG. 4A is the signal applied to the circuit of MOSFET 15; and waveforms 67, 68 and 70 of FIGS. 4B, 4C and 4D, respectively, are the signals applied to the circuits of MOSFETs 16, 17 and 18, respectively. The time scale of FIG. 4 is not the same as that of FIG. 3. In the case of FIG. 4, each on pulse has a duration of 55 microseconds; and there is a delay of 62.5 microseconds between waveforms. Thus, there is no overlap of pulses. The action of charge pump 30 with respect to each waveform is confined to the on pulse duration and need only serve one MOSFET at a time.

There is no need for waveforms for the third step of energization, since charge pump 30 serves all MOSFETs continuously and simultaneously. However, this creates no problem - at this point the lamps are all on; and the gate voltages are allowed to increase at the rate of which the charge pump is capable.

Figure 2:
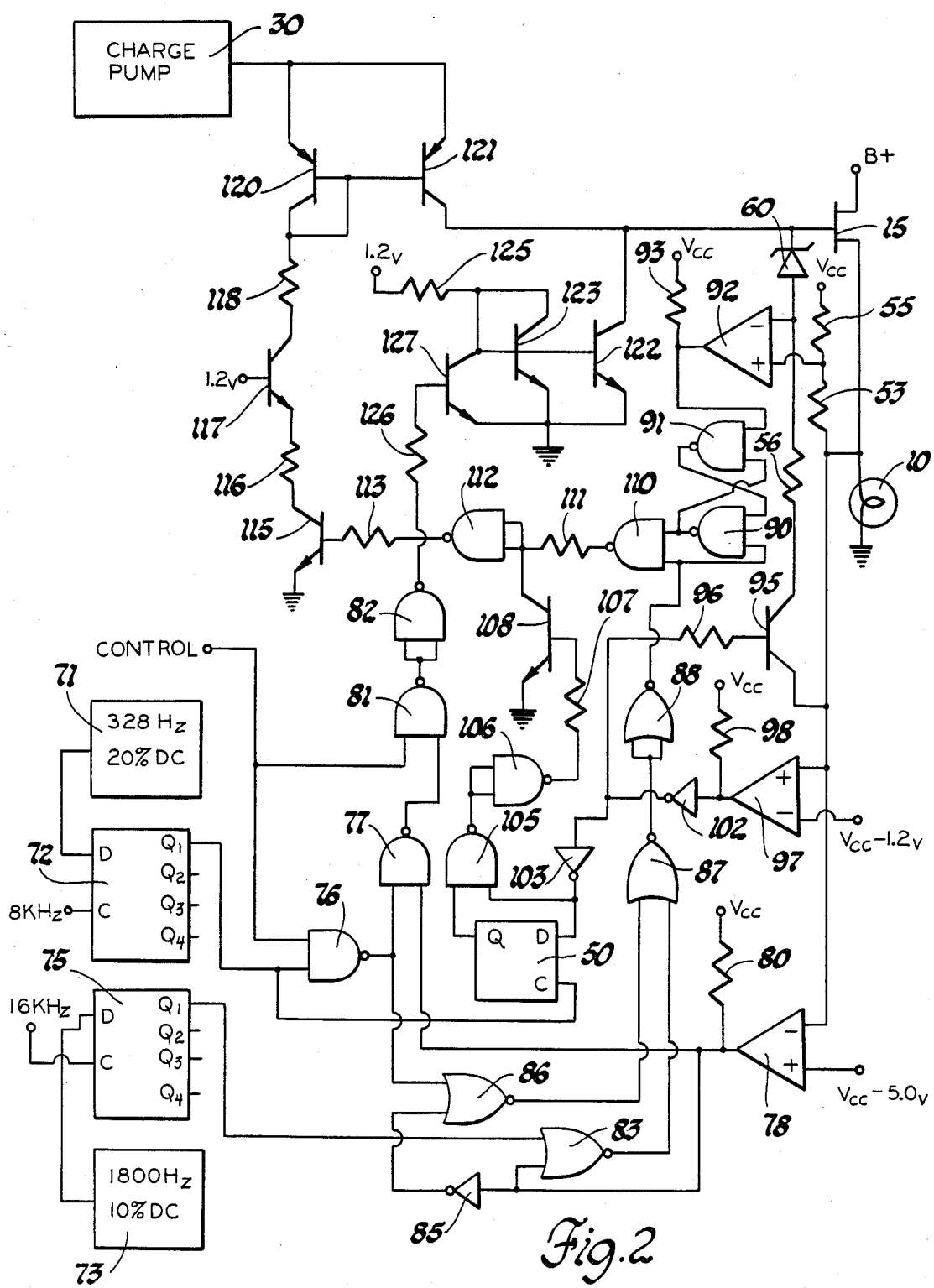
FIG. 2 shows a circuit diagram of a portion of the embodiment of FIG. 1.

A more detailed circuit diagram of a portion of the embodiment of FIG. 1 is shown in FIG. 2. The elements of FIG. 2 are given the same reference numerals as in FIG. 1 where they are identical to the same elements in FIG. 1; otherwise, they are given new numbers, even though they correspond to and perform the same functions as elements of FIG. 1. Timing circuit 31 of FIG. 1 is shown to comprise a standard 328 Hz, 20 percent duty cycle oscillator 71 providing its output to the D input of a shift register 72 having an 8 KHz clock signal and four outputs $Q_1$–$Q_4$. Each of the outputs provides the signal for one of the circuits in order. As the output of oscillator 71 goes high, the clock signal clocks the high input to shift register 72 from one output to the next at a rate of one step every 125 microseconds, the previous outputs remaining high as the input does. When, after 600 microseconds, the output of oscillator 71 goes low, the outputs are similarly cleared by the clock signal at the same step rate. This produces waveforms 61–64 shown in FIG. 3A–3D.

Similarly, timing circuit 33 comprises a 1800 Hz, 10 percent duty cycle oscillator 73 providing its output to the D input of a shift register 75 similar to shift register 72 but clocked by a 16 KHz clock signal. Once every 555 microseconds the oscillator output goes high for 55 microseconds; and during this 55 microsecond period a clock pulse clocks the high voltage into shift register 75. The oscillator output is low again before the next clock pulse, so the high output is stepped from one output to the next, creating waveforms 66–70 as shown in FIG. 4A–4D.

The $Q_1$ output of shift register 72 is connected to one input of a NAND gate 76 and to the C input of flip-flop 50. The $Q_2$–$Q_4$ outputs are, of course, provided to similar elements in the circuits for the other MOSFETs. The CONTROL signal is provided to the other input of NAND gate 76; and the output of NAND gate 76 is connected to one input of a NAND gate 77, which receives its other input from the output of a comparator 78. Comparator 78, together with its output pull-up resistor 80 (10K) to $V_{cc}$, corresponds to comparator 46 in FIG. 1. The output of NAND gate 77 and the CONTROL signal are provided to the inputs of a NAND gate 81 having an output connected to both inputs of a NAND gate 82 used as an inverter.

The output of comparator 78 is connected to one input of a NOR gate 83 having its other input from output $Q_1$ of shift register 75. It is further connected through an inverter 85 to one input of a NOR gate 86 having its other input connected to the output of NAND gate 76. The outputs of NOR gates 83 and 86 are provided to the inputs of a NOR gate 87 with an output connected to both inputs of a NOR gate 88 used as an inverter. The output of NOR gate 88 is connected to one input of a NAND gate 90 which, together with another NAND gate 91, corresponds to flip-flop 38. The output of NAND gate 90 is connected to one input of NAND gate 91, the output of which is connected to the other input of NAND gate 90. The other input of NAND gate 91 is connected to the output of a comparator 92 which, together with its pull-up resistor 93 (10K) to $V_{cc}$, corresponds to comparator 52 of FIG. 1. FET 15 has its drain connected to B+, its source connected through lamp 10 to ground and its base connected through zener diode 60 to the inverting input of comparator 92. The non-inverting input of comparator 92 is connected to the junction of a voltage divider comprising resistor 55 (91K) to $V_{cc}$ and resistor 53 (9.7K) to the source of FET 15. The inverting input of comparator 92 is connected through resistor 56 (18K) to the collector of a bipolar NPN transistor 95 having an emitter connected to the source of FET 15 and corresponding, with its base resistor 96 (20K), to switch 57 of FIG. 1.

The source of FET 15 is further connected to the inverting input of comparator 78 and to the non-inverting input of a comparator 97 which, together with its pull-up resistor 98 (10K) to $V_{cc}$, corresponds to comparator 48 in FIG. 1. The output of comparator 97 is connected through an inverter 102 and resistor 96 to the base of transistor 95. The output of inverter 102 is further connected through an inverter 103 to the D input of flip-flop 50 and to one input of a NAND gate 105, the other input of which is connected to the Q output of flip-flop 50. The output of NAND gate 105 is connected to both inputs of a NAND gate 106 which, together with NAND gate 105, corresponds to AND gate 51 of FIG. 1. The output of NAND gate 106 is connected through a resistor 107 (10K) to the base of a bipolar NPN transistor 108 having a grounded emitter. A NAND gate 110 has inputs from the output of NAND gate 90 and from the output of NOR gate 88 and further has an output connected through a resistor 111 (10K) to the collector of transistor 108 and both inputs of a NAND gate 112. The output of NAND gate 112 is connected through a resistor 113 (10K) to the base of a bipolar NPN transistor 115 having a grounded emitter and a collector connected through a resistor 116 (24K) to the emitter of a bipolar NPN transistor 117. Transistor 117 has a base provided with a voltage of 1.2 volts and a collector connected through a resistor 118 (1 M) to the collector of a bipolar PNP transistor 120. Transistor 120 is connected emitter to emitter and base to base in a current mirror configuration with another bipolar PNP transistor 121, with the bases of transistors 120 and 121 connected to the collector of 120 and the emitters of transistors 120 and 121 connected to the output of charge pump 30.

The collector of transistor 121 is connected to the gate of FET 15 and also to the collector of a bipolar NPN transistor 122 having a grounded emitter. Transistor 122 is connected emitter to emitter and base to base in a current mirror configuration with another bipolar NPN transistor 123 having a collector connected to its base and through a resistor 125 (4.7K) to a voltage of 1.2 volts. Another bipolar NPN transistor 127 has a grounded emitter, a collector connected to the bases of transistors 122 and 123 and a base connected through a resistor 126 (10K) to the output of NAND gate 82. The arrangement of transistors 122 and 123 corresponds to current source 45 switchable by transistor 127, which corresponds to switch 43. Likewise, transistors 120 and 121 together correspond to current source 25, switchable by the combination of transistors 117 and 115 and their associated resistors, which roughly correspond to switch 20. Two transistors 115 and 117 are used in series in this embodiment because one transistor by itself will not sustain the full 36 volts of charge pump 30 across its collector-emitter.

The embodiments of the invention in which an exclusive property or privilege is claimed are defined as follows:

1. A power MOSFET switching control for multiple loads requiring current limiting at initial energization, the control comprising, in combination:
   an electric power supply having a supply voltage;
   at least two MOSFETs, each having a pair of current carrying electrodes connected in series between one of the multiple loads and the power supply, a control electrode responsive to the voltage between the control electrode and one of the current carrying electrodes to control the current flow between the current carrying electrodes and therefore through the corresponding load, and a control electrode capacitance;
   a single charge pump powered by the power supply and effective to provide a current flow at a voltage larger than that of the power supply; and
   means for connecting each of the MOSFET control electrodes to the charge pump repeatedly in a pulsed manner to limit average current through the MOSFET, the individual control electrodes being connected to the charge pump alternately in a predetermined order such that no two control electrodes are connected to the charge pump simultaneously.

2. The switching control of claim 1 in which the means for connecting each of the MOSFET control electrodes to the charge pump comprises an electrically controlled switch for each control electrode and clocked multiplexing switch control means effective to activate each switch to connect the corresponding control electrode to the charge pump in a predetermined order with a first predetermined delay between each two successive activations and further effective to disconnect each control electrode from the charge pump before the following control electrode is connected.

3. The switching control of claim 1 in which the means for connecting each of the MOSFET control electrodes to the charge pump comprises an electrically controlled switch for each control electrode and clocked multiplexing switch control means effective to activate each switch to connect the corresponding control electrode to the charge pump in a predetermined order with a first predetermined delay between each two successive activations, the clocked multiplexing switch control means being further effective in response to the control electrode voltage of each MOSFET to disconnect the control electrode from the charge pump when the control electrode voltage each MOSFET to disconnect the control electrode from the charge pump when the control electrode voltage exceeds a first predetermined voltage, the charge pump being effective to raise the control electrode voltage to the first predetermined voltage within the first predetermined delay before the next MOSFET control electrode is connected to the charge pump.

4. The switching control of claim 3 further including discharge means for the control electrode capacitance of each MOSFET and wherein the clocked multiplexing switch control means is further effective to activate the discharge means for each MOSFET a second predetermined delay after the switch activation for the MOSFET, the second predetermined delay being longer than the first predetermined delay.

5. A vehicle multiple lamp control, the lamps being of the type having a resistance which is low when the filament is cold and increasing with filament temperature, the control comprising, in combination:

an electric power supply having a supply voltage;

at least two MOSFETs, each having a pair of current carrying electrodes connected in series between one of the multiple lamps and the power supply, a control electrode responsive to the voltage between the control electrode and one of the current carrying electrodes to control the current flow between the current carrying electrodes and therefore through the corresponding lamp, and a control electrode capacitance;

a single charge pump powered by the power supply and effective to provide a current flow at a voltage larger than that of the power supply;

an electrically controlled switch for each MOSFET control electrode for controlling connection of the control electrode to the charge pump;

first clocked multiplexing switch control means effective to activate each switch to connect the corresponding control electrode to the charge pump in a predetermined order with a first predetermined delay between each two successive activations and further effective to disconnect each control electrode from the charge pump before the following control electrode is connected;

discharge means for the control electrode capacitance of each MOSFET;

second clocked multiplexing switch control means effective to activate each switch to connect the corresponding control electrode to the charge pump in a predetermined order with a second predetermined delay between each two successive activations and further effective to activate the discharge means for each MOSFET a third predetermined delay after the switch activation for the MOSFET, the third predetermined delay being longer than the second predetermined delay;

means responsive, when activated, to the control electrode voltage of each MOSFET to disconnect the control electrode from the charge pump when the control electrode voltage exceeds a first predetermined voltage, the charge pump being effective to raise the control electrode voltage to exceed the first predetermined voltage within the second predetermined delay before the next MOSFET control electrode is connected to the charge pump; and means responsive to the voltage drop across each lamp to alternatively activate the first clocked multiplexing switch control means, when the voltage drop exceeds a first predetermined reference, and both the second clocked, multiplexing switch control means and the means responsive to the control electrode voltage, when the voltage drop does not exceed the first predetermined reference.

6. The vehicle multiple lamp control of claim 5 further comprising means responsive to the voltage drop across each lamp to override the first and second clocked multiplexing switch control means and continuously activate the switch for the corresponding MOSFET control electrode to connect it to the charge pump when the voltage drop exceeds a second predetermined reference greater than the first, the second predetermined reference being sufficient to ensure that the charge needs of all the MOSFET control electrodes simultaneously do not exceed the capacity of the charge pump.

* * * * *